UNITED STATES PATENT OFFICE 2,472,575

N-(4,5-DIHYDROXY-N-AMYL) AND N-(4,5-DI-ACYLOXY-N-AMYL) AROMATIC AMINES

Joseph B. Dickey, Rochester, N. Y., assignor to Eastman Kodak Company, Rochester, N. Y., a corporation of New Jersey No Drawing. Application August 4, 1944, Serial No. 548,140

4 Claims. (Cl. 260—244)

This invention relates to aromatic amino compounds containing on the amino nitrogen atom a 4,5-dihydroxy-n-amyl or a 4,5-diacyloxy-n-amyl group, and to a process for preparing such compounds.

N-(β-hydroxyethyl)-aniline and N-(β,γ-dihydroxypropyl)-aniline are well known compounds which are very useful as dye intermediates. The former of these compounds can be prepared by condensing aniline with ethylene oxide. The latter compound does not lend itself to preparation in a similar manner, and is prepared by condensing aniline with α-glycerol monochlorohydrin in the presence of an acid-binding agent. The former compound can also be prepared by condensing aniline with ethylene chlorohydrin, in the presence of an acid-binding agent.

I have now found that N-(4,5-dihydroxy-n-amyl)-aromatic amines can be prepared by condensing 4,5-diacyloxy-n-amyl halides (1-halogenopentane-4,5-diol dicarboxylates) with aromatic amines, and hydrolyzing the resulting N-(4,5-diacyloxy-n-amyl)-aromatic amine. The N-(4,5-dihydroxy-n-amyl)-aromatic amines are especially useful as coupling components in the formation of azo dyes (see the copending application of Joseph B. Dickey and James G. McNally, Serial No. 484,079, filed April 22, 1943, now Patent No. 2,386,599, of which the instant application is a continuation-in-part). My new hydroxyalkyl compounds contain a hydroxyalkyl group having five carbon atoms and two hydroxyl groups (ratio of 5:2) and differ from the known N-(hydroxyalkyl)-aromatic amines which contain carbon atoms and hydroxyl groups in the hydroxyalkyl group in a ratio not greater than 2:1, in that my new compounds yield azo dyes which remain bright on the textile after being applied to textiles made from cellulose acetate rayon yarn, whereas azo dyes containing N-hydroxyalkyl groups of equal carbon content but having a smaller carbon atom to hydroxyl group ratio tend to become dull on the textile.

It is, accordingly, an object of my invention to provide new amino compounds and to provide a process for the preparation thereof. Other objects will become apparent hereinafter.

In accordance with my invention, an aromatic amine of the primary or secondary type, is condensed with a 4,5-diacyloxy-n-amyl halide, in the presence of an acid-binding agent. Aromatic amines of the primary or secondary type include aniline, m-chloroaniline, m-anisidine, o-anisidine, o-toluidine, o-chloroaniline, α-naphthylamine, β-naphthylamine, o-aminodiphenyl, tetrahydroquinoline, benzomorpholine, o-nitroaniline, 2-methyltetrahydroquinoline, 7-methyltetrahydroquinoline, 2-methylbenzomorpholine, N-methylaniline, N-ethylaniline, N-(β-hydroxyethyl)-aniline, N-(β-hydroxyethyl)-m-toluidine, etc. A group of aromatic amines which give rise to very useful compounds in accordance with my invention can be defined by the following general formula:

wherein R represents an aryl group containing not more than two carbocyclic rings, the position in the aryl group para to the

group containing only a hydrogen atom, and R' represents hydrogen or an alcohol radical, e. g. methyl, β-hydroxyethyl, ethyl, β-ethoxyethyl, tetrahydrofurfuryl 4,5-dihydroxy-n-amyl, etc. Another group of amines which also give rise to very useful compounds in accordance with my invention can be defined by the following general formula:

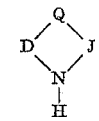

wherein D represents a monocyclic o-arylene group of the benzene series, the position in the o-arylene group para to the

group containing only a hydrogen atom, J represents a 1,2-alkylene group and Q represents a member selected from the group consisting of methylene and oxygen.

The 4,5-diacyloxy-n-amyl halides employed in practicing my invention can be prepared by treating tetrahydrofurfuryl alcohol with an acyl halide, in the presence of fused zinc chloride (see Compt. rend., 211, 645 (1940)). The chlorides are most readily prepared and are advantageously used in practicing my invention.

The following examples will serve to illustrate my new compounds and the manner of obtaining the same.

*Example 1.—N-(β-hydroxyethyl)-N-(4,5-diacetoxy-n-amyl)-m-toluidine*

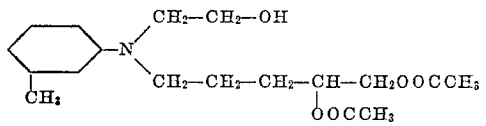

15.1 g. (0.1 mole) of N-(β-hydroxyethyl)-m-toluidine were mixed with 25 g. (0.11 mole) of 4,5-diacetoxy-n-amyl chloride (1-chloropentane-4,5-diol diacetate) and 63 g. (0.6 mole) of sodium carbonate. The mixture was heated, with stirring, at 180° to 190° C. for 5 hours in an oil bath. The mixture was cooled and diluted with 50 cc. of ethyl alcohol. The sodium chloride was filtered off. The alcohol was removed from the filtrate by distillation and the residue was distilled under reduced pressure. The N-(β-hydroxyethyl)-N-(4,5-diacetoxy-n-amyl)-m-toluidine distilled at 238° to 241° C. at 4 mm. of mercury pressure.

*Example 2.—N-(β-hydroxyethyl)-N-(4,5-dihydroxy-n-amyl)-m-toluidine*

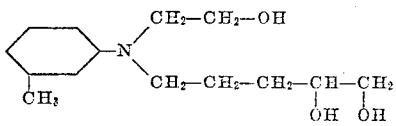

5 g. of the N-(β-hydroxyethyl)-N-(4,5-diacetoxy-n-amyl)-m-toluidine obtained in the foregoing example was heated with 30 cc. of 10 per cent (by weight) aqueous sulfuric acid at 95°–100° C. for about 3 hours. The mixture was then cooled and made alkaline with sodium hydroxide. The oil which separated was taken up in diethyl ether. The ether was removed from the extract by distillation and the residue distilled under reduced pressure. The N-(β-hydroxyethyl)-N-(4,5-dihydroxy-n-amyl)-m-toluidine distilled at 245° to 250° C. at 4 mm. of mercury pressure.

*Example 3.—N-(4,5-diacetoxy-n-amyl)-2-methyl-1,2,3,4-tetra-hydroquinoline*

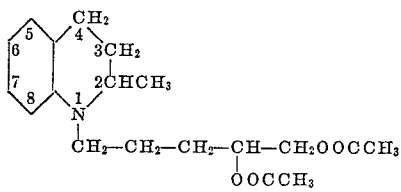

14.7 g. (0.1 mole) of 2-methyl-1,2,3,4-tetrahydroquinoline, 25 g. (0.11 mole) of 4,5-diacetoxy-n-amyl chloride (1-chloropentane-4,5-diol diacetate) and 63 g. (0.6 mole) of sodium carbonate were heated with stirring in an oil bath at 200° C. for about 5 hours. The mixture was cooled, and diluted with 50 cc. of ethyl alcohol. The salt (sodium chloride) was filtered off. The filtrate was distilled to remove ethyl alcohol and the residue was distilled under reduced pressure. About ⅔ of the residue was unreacted 4,5-diacetoxy-n-amyl chloride and 2-methyl-1,2,3,4-tetrahydroquinoline. The N-(4,5-diacetoxy-n-amyl)-2-methyl-1,2,3,4-tetrahydroquinoline distilled over at 215° to 225° C. at 9 mm. of mercury pressure. It was a very viscous liquid.

*Example 4.—N-(4,5-dihydroxy-n-amyl)-2-methyl-1,2,3,4-tetrahydroquinoline*

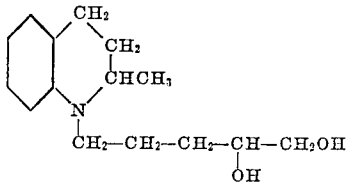

5 g. of the N-(4,5-diacetoxy-n-amyl)-2-methyl-1,2,3,4-tetrahydroquinoline obtained in Example 3 were heated on a steam bath with 30 cc. of aqueous sulfuric acid (1 part by weight of acid and 6 parts of water), for 3 hours. The mixture was then made alkaline with sodium carbonate. The alkaline mixture was extracted with benzene. The benzene extract was washed with water. The benzene was then removed from the extract by distillation under reduced pressure, leaving N-(4,5-dihydroxy-n-amyl)-2-methyl-1,2,3,4-tetrahydroquinoline.

*Example 5.—N,N-di-(4,5-dihydroxy-n-amyl)-n-toluidine*

10.7 g. (0.1 mole) of m-toluidine, 66 g. (0.25 mole) of 4,5-diacetoxy-n-amyl bromide (1-bromopentane-4,5-diol diacetate) and 126 g. of sodium carbonate were heated with stirring for 6 hours at 150° to 180° C. The mixture was cooled and diluted with 50 cc. of ethyl alcohol. The salt was filtered off. The filtrate was distilled under reduced pressure and the N,N-di-(4,5-diacetoxy-n-amyl)-m-toluidine distilled over at 193° to 199° C. at 1.5 mm. of mercury pressure. 5 g. of this diacetoxy compound was heated with 30 cc. of 10 per cent (by weight) aqueous sulfuric acid at 95°–100° C. for about 3 hours. The mixture was cooled and made alkaline with sodium hydroxide. The alkaline mixture was extracted with diethyl ether. The ether was distilled from the extract and the residue was distilled under reduced pressure. N,N-di-(4,5-dihydroxy)-n-amyl-m-toluidine distilled at 196°–202° C. at 2 mm. of mercury pressure.

In a manner similar to that illustrated in the foregoing examples the following compounds were prepared:

| | Boiling point, °C. |
|---|---|
| N-(4, 5-diacetoxy-n-amyl)-α-naphthylamine | 252–257/4 mm. |
| N-(4, 5-dihydroxy-n-amyl)-α-naphthylamine | 240–250/4 mm. |
| N-(4, 5-diacetoxy-n-amyl)-2-methoxy-5-methyl-benzene | 220–235/4 mm. |
| N-(4, 5-dihydroxy-n-amyl)-2-methoxy-5-methyl-benzene | 194–198/3 mm. |
| N-(4, 5-diacetoxy-n-amhl)-N-methylaniline | 222–224/15 mm. |
| N-(4, 5-dihydroxy-n-amyl)-N-methylaniline | 215–220/14 mm. |
| N-(4, 5-dipropoxy-n-amyl)-N-methylaniline | 230–235/16 mm. |
| N-ethyl-N-(4, 5-diacetoxy-n-amyl)-aniline | 186–205/4 mm. |
| N-ethyl-N-(4, 5-dihydroxy-n-amyl)-aniline | 186–190/4 mm. |
| N-(4, 5-diacetoxy-n-amyl)-7-methyl-1, 2, 3, 4-tetrahydroquinoline | 215–218/4 mm. |
| N-(4, 5-dihydroxy-n-amyl)-7-methyl-1, 2, 3, 4-tetrahydroquinoline | 221–223/4 mm. |
| N-(4, 5-dihydroxy-n-amyl)-2, 7-dimethylbenzomorpholine | 223–228/1 mm. |

N,N-di-(4,5-dihydroxy-n-amyl)-4-amino-3-methylbenzene, boiling at 220°–225° C. at 12 mm. of mercury pressure, was prepared by coupling N,N-di-(4,5-dihydroxy-n-amyl)-m-toluidine with diazotized sulfanilic acid and reducing the sodium salt of the resulting azo compound in water with hydrogen, under pressure, using a nickel catalyst of the Raney type. The reduction reaction mixture was extracted with ether and the ether extract distilled to obtain the 4,5-dihydroxy-n-amyl compound.

My new compounds can also be employed in the preparation of indophenol dyes.

As acid-binding agents, not only alkali metal carbonates can be employed as illustrated in the foregoing examples, but alkaline earth metal carbonates, alkali metal hydroxides, alkaline earth metal hydroxides and tertiary amines can be employed. In hydrolyzing the 4,5-diacyloxy compounds to obtain the 4,5-dihydroxy compounds, the hydrolysis is advantageously carried out in the presence of a water-soluble acid. Hydrochloric acid, phosphoric acid or chloric acid may be employed instead of the sulfuric acid illustrated in the foregoing examples. Alkaline hydrolysis can also be employed to convert the diacyloxy compounds to the dihydroxy compounds.

What I claim as my invention and desire to be secured by Letters Patent of the United States is:

1. The amines which are represented by the following general formula:

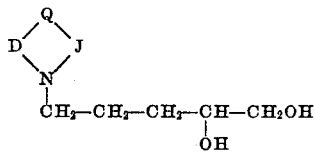

wherein D represents a monocyclic o-arylene group of the benzene series, the carbon atom in the aryl group in the para position to the

group having only a hydrogen atom attached thereto, J represents a 1,2-alkylene group and Q represents a member selected from the group consisting of a methylene group and an oxygen atom.

2. The amines which are represented by the following general formula:

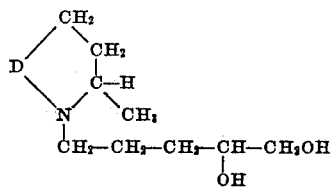

wherein D represents a monocyclic o-arylene group of the benzene series, the carbon atom in the aryl group in the para position to the

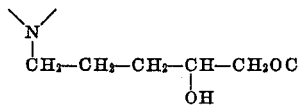

group having only a hydrogen atom attached thereto.

3. The amines which are represented by the following general formula:

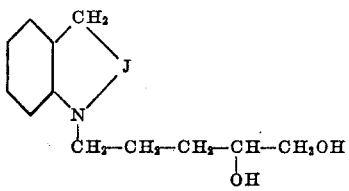

wherein J represents a 1,2-alkylene group.

4. N-(4,5-dihydroxy-n-amyl)-2-methyl-1,2,3,4-tetrahydroquinoline.

JOSEPH B. DICKEY.

REFERENCES CITED

The following references are of record in the file of this patent:

UNITED STATES PATENTS

| Number | Name | Date |
| --- | --- | --- |
| 1,735,961 | Dreyfus | Nov. 19, 1929 |
| 2,190,133 | Epstein | Feb. 13, 1940 |

OTHER REFERENCES

Chemical Abstracts, vol. 33, page 6259 (1939); ibid., vol. 36, page 751 (1942).

Beilstein: "Handbuch der Organischem Chemie," (4th ed.), vol. 12, page 183 (1929).

Karrer: "Organic Chemistry" (Nordemann Publishing Co., New York; 1938) pages 71 and 72.

Compt. rend., vol. 211, page 645 (1940).